Patented June 12, 1945

2,378,363

UNITED STATES PATENT OFFICE 2,378,363

ALKYLATED MELAMINE-FORMALDEHYDE COATING COMPOSITIONS

Robert C. Swain, Riverside, and Pierrepont Adams, Stamford, Conn., assignors to American Cyanamid Company, New York, N. Y., a corporation of Maine No Drawing. Application October 26, 1940, Serial No. 363,002

4 Claims. (Cl. 260—24)

This invention relates to coating compositions containing melamine-formaldehyde resins and hydrogenated methyl abietate.

An object of this invention is to improve the physical and chemical properties of melamine-formaldehyde compositions, e. g., flexibility, adhesion, etc.

Another object of this invention is to provide compositions containing hydrogenated methyl abietate and compatible proportions of compatible melamine-formaldehyde resins.

These and other objects are attained by blending hydrogenated methyl abietate with a melamine-formaldehyde resin which has been alkylated with an alcohol selected from the group consisting of ethylene chlorohydrin, propyl alcohols, butyl alcohols, hexyl alcohols, benzyl alcohol and octyl alcohols, and wherein the molal ratio of formaldehyde to melamine is at least about 4:1.

The following examples in which the proportions are in parts by weight are given by way of illustration and not in limitation. The hydrogenated methyl abietate used in the following examples is a product sold under the trade name of "Hercolyn" by the Hercules Powder Company and it is essentially dihydromethyl abietate ($C_{19}H_{31}COOCH_3$).

Example 1

| | Parts |
|---|---|
| Melamine-formaldehyde resin "A" | 10 |
| Hydrogenated methyl abietate ("Hercolyn") | 90 |

A composition containing these ingredients is prepared by admixing 20 parts of melamine-formaldehyde resin "A" solution (50% resin) with 90 parts of hydrogenated methyl abietate. Films of the composition are applied to metal objects and baked at a temperature of about 135° C. for about one-half hour. The product is a somewhat soft, transparent coating.

Example 2

| | Parts |
|---|---|
| Melamine-formaldehyde resin "B" | 50 |
| Hydrogenated methyl abietate ("Hercolyn") | 50 |

A composition containing these ingredients is prepared by admixing 100 parts of melamine-formaldehyde resin "B" solution (50% resin) with 50 parts of hydrogenated methyl abietate. Films of the composition are applied to metal objects and baked at a temperature of about 135° C. for about one-half hour. A film having excellent flexibility, chemical resistance, etc., is formed.

Example 3

| | Parts |
|---|---|
| Melamine-formaldehyde resin "C" | 90 |
| Hydrogenated methyl abietate ("Hercolyn") | 10 |

A composition containing these ingredients is prepared by admixing 180 parts of melamine-formaldehyde resin "C" solution (50% resin) with 10 parts of hydrogenated methyl abietate. Films of the composition are applied to metal objects and baked at a temperature of about 135° C. for about one-half hour. A hard, water-white film having good chemical properties is formed.

Example 4

| | Parts |
|---|---|
| Melamine-formaldehyde resin "D" | 75 |
| Hydrogenated methyl abietate ("Hercolyn") | 25 |

A composition containing these ingredients is prepared by admixing 150 parts of melamine-formaldehyde resin "D" solution (50% resin) with 25 parts of hydrogenated methyl abietate. Films of the composition are applied to metal objects and baked at a temperature of about 135° C. for about one-half hour. A clear, tough film is formed.

Example 5

| | Parts |
|---|---|
| Melamine-formaldehyde resin "E" | 10 |
| Hydrogenated methyl abietate ("Hercolyn") | 90 |

A composition containing these ingredients is prepared by admixing 20 parts of melamine-formaldehyde resin "E" solution (50% resin) with 90 parts of hydrogenated methyl abietate. Films of the composition are applied to metal objects and baked at a temperature of about 135° C. for about one-half hour. The product is a somewhat soft clear, water-white film.

Example 6

| | Parts |
|---|---|
| Melamine-formaldehyde resin "F" | 25 |
| Hydrogenated methyl abietate ("Hercolyn") | 75 |

A composition containing these ingredients is prepared by admixing 50 parts of melamine-formaldehyde resin "F" solution (50% resin) with 75 parts of hydrogenated methyl abietate. Films of the composition are applied to metal objects and baked at a temperature of about 135° C. for about one-half hour. The product formed is a clear coating having good flexibility.

Example 7

| | Parts |
|---|---|
| Melamine-formaldehyde resin "G" | 50 |
| Hydrogenated methyl abietate ("Hercolyn") | 50 |

A composition containing these ingredients is prepared by admixing 100 parts of melamine-formaldehyde resin "G" solution (50% resin) with 50 parts of hydrogenated methyl abietate. Films of the composition are applied to metal objects and baked at a temperature of about 135° C. for about one-half hour. The product is a transparent coating which is quite resistant to moisture, temperature changes, solvents, etc.

*Example 8*

| | Parts |
|---|---|
| Melamine-formaldehyde resin "H" | 90 |
| Hydrogenated methyl abietate ("Hercolyn") | 10 |

A composition containing these ingredients is prepared by admixing 180 parts of melamine-formaldehyde resin "H" solution (50% resin) with 10 parts of hydrogenated methyl abietate. Films of the composition are applied to metal objects and baked at a temperature of about 135° C. for about one-half hour. A hard film having good chemical properties is formed.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "D"*

| | Parts |
|---|---|
| Melamine (1 mol) | 126 |
| Formalin (4 mols) (37% formaldehyde in water) | 446.05 |
| Ethylene chlorohydrin | 440 |

This mixture is refluxed at a temperature of about 95–100° C. at atmospheric pressure for 6–12 hours. Substantially all of the water is removed by distillation with 550 additional parts of ethylene chlorohydrin. By this time the vapor temperature of the distillate has risen to about 100–105° C. The pressure is lowered sufficiently to reduce the temperature to 85–90° C. When substantially all of the water has been removed, the resin solution is concentrated to about 50% solids by vacuum distillation.

*Preparation of melamine-formaldehyde resin "E"*

| | Parts |
|---|---|
| Melamine-formaldehyde (molal ratio 1:4) spray-dried powder | 300 |
| n-Propanol | 1200 |
| Methyl acid phosphate | 3 |

The melamine-formaldehyde condensation product is obtained by refluxing melamine and formalin (37% formaldehyde in water) in the molal ratio of 1:4 at a pH of about 7-9 for about 3 hours and then spray-drying.

The spray-dried melamine-formaldehyde powder, propanol and methyl acid phosphate are heated to about 90° C. in 40 minutes and refluxed about 30 minutes. This solution is vacuum concentrated at about 50-60° C. until 767 parts of volatile material are distilled off. The resin solution thus formed contains about 48% solids.

*Preparation of melamine-formaldehyde resin "F"*

|  | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80-85° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "G"*

|  | Parts |
|---|---|
| Melamine-formaldehyde (molal ratio 1:4) spray-dried powder | 200 |
| 2-ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7-9 for about 3 hours and the spray-drying.

The spray-dried melamine-formaldehyde powder, octanol, butanol and methyl acid phosphate are heated to about 100-105° C. in 30 minutes and refluxed about 30 minutes. This solution is vacuum concentrated at about 50-70° C. to form a product containing about 50% solids.

*Preparation of melamine-formaldehyde resin "H"*

|  | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93-95° C. at atmospheric pressure for 6-12 hours. The water is removed by azeotropic distillation from the reaction mixture during the reflux operation beginning preferably after about 2-5 hours have elapsed and the water so removed is separated from the reflux condensate in the water trap. When the reflux condensate is substantially anhydrous the vapor temperature will be about 100-105° C. The pressure is lowered sufficiently to reduce the vapor temperature to about 85-90° C. and the resin solution is concentrated to about 60-70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation or melamine, formaldehyde and a suitable alcohol is used because of convenience. In order to facilitate the alkylation with the higher alcohols, e. g., the hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations of control during their production and in some instances a small proportion of a suitable solvent material, e. g., benzene, xylene, toluene, ethyl acetate, butanol, butyl acetate, the monoethyl ether of ethylene glycol (Cellosolve), etc., may be added to the original solutions of melamine-formaldehyde resin and hydrogenated methyl abietate in order to produce perfectly clear solutions if such solutions are not originally obtained.

While formaldehyde has been used in the previous examples, it will be obvious that other aldehydes such as various polymers of formaldehyde, e. g., paraformaldehyde, or substances which yield formaldehyde may be used in place of part or all of the formaldehyde.

The melamine-formaldehyde resins suitable for use according to our invention may be alkylated with any of the alcohols selected from the group consisting of ethylene chlorohydrin, propyl alcohols, butyl alcohols, benzyl alcohol and octyl alcohols. Obviously various mixtures of alcohols may be used. The term "alkylated melamine-formaldehyde resin" is intended to denote compositions which are reacted with an alcohol.

Hydrogenated methyl abietate has been found to be compatible with all proportions of melamine-formaldehyde resins wherein the molal ratio of formaldehyde to melamine is at least 4:1 and where the resin is alkylated with an alcohol selected from the group mentioned above. Surprisingly enough hydrogenated methyl abietate is only compatible in proportions up to about 25% with melamine-formaldehyde resins which are alkylated with mixed amyl alcohols (sold under the trade name of "Pentasol") and wherein the molal ratio of formaldehyde to melamine is about 6:1. Ethylated melamine-formaldehyde resins have been found to be incompatible with hydrogenated methyl abietate in substantially all proportions. Butylated melamine-formaldehyde resins wherein the molal ratio of formaldehyde to melamine is about 2.5:1 as well as those wherein the molal ratio is about 3:1 are compatible with hydrogenated methyl abietate in proportions up to about 20% of the latter. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in this paragraph is on a total solids weight basis.

Our compositions may be used in admixture with other resinous compositions, e. g., urea-formaldehyde resins, phenol-formaldehyde resins, ester gum, chlorinated rubbers, alkyd resins, modified alkyd resins such as the terpene-maleic acid-polyhydric alcohol resins, etc. They may also be used in drying oil vehicles such as linseed oil and the like, especially in combination with soluble phenol-formaldehyde resin materials.

While hydrogenated methyl abietate is itself a plasticizer for melamine-formaldehyde resins, nevertheless, other plasticizers may be incorporated into our products such as the alkyl phthalates, especially dibutyl phthalate, tricresyl phosphate, alkyd resins, etc.

Various fillers, pigments, dyes and lakes may be added to our compositions, e. g., lithopone, zinc oxide, titanium oxide, ferric oxide, Prussian blue, toluidine red, malachite green, mica, ground glass, glass fibers, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Mixtures of melamine-formaldehyde resins and hydrogenated methyl abietate are especially suitable for use in coating compositions which require good alkali resistance, good heat resistance, good water resistance, high solvent resistance, resistance to temperature changes, etc. Accordingly, they are particularly useful in furniture lacquers, in combination with cellulose esters or cellulose ethers, e. g., nitrocellulose, ethyl cellulose, etc. Some of our compositions are also especially useful with chlorinated rubber in the manufacture of protective coatings, particularly in industrial factories where resistance to various chemical reagents is desired. Our compositions are also of use in the manufacture of adhesives, especially those which contain a relatively large proportion of hydrogenated methyl abietate. In the manufacture of adhesives our products may optionally be admixed with adhesive materials such as rubber, ethyl cellulose, chlorinated rubber, copolymers of vinyl acetate and vinyl chloride, etc.

Our compositions are especially useful in the treatment of paper, for the production of transparent and translucent materials, for increasing the hydrophobic properties of paper, for increasing the wet strength of paper, etc. Our mixtures may also be used in treating cloth and in the manufacture of printing inks, as well as in the production of various paints and enamels. Hydrogenated methyl abietate is quite resistant to chemicals and hence it does not add any particularly undesirable properties to melamine-formaldehyde resin compositions. On the other hand, hydrogenated methyl abietate is a non-drying material and hence generally some film forming material must be admixed with it in order to obtain products suitable for use in the coating composition field. Melamine-formaldehyde resins are particularly suited for this purpose inasmuch as they are readily converted to the infusible insoluble stage. Since hydrogenated methyl abietate is soluble in many solvents, and itself dissolves many substances it is desirable that compositions containing it also contain an insolubilizing material. Even small proportions of melamine-formaldehyde resins are suitable for substantially decreasing the sensitivity to solvent materials characteristic of hydrogenated methyl abietate.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing hydrogenated methyl abietate and a melamine-formaldehyde resin which has been reacted with an alcohol selected from the group consisting of ethylene chlorohydrin, propyl alcohols, butyl alcohols, benzyl alcohol and octyl alcohols, and wherein the molal ratio of formaldehyde to melamine is at least about 4:1.

2. A coating composition containing hydrogenated methyl abietate and a melamine-formaldehyde resin which has been reacted with n-butanol and wherein the molal ratio of formaldehyde to melamine is at least about 4:1.

3. A coating composition containing hydrogenated methyl abietate and a melamine-formaldehyde resin which has been reacted with benzyl alcohol and wherein the molal ratio of formaldehyde to melamine is at least about 4:1.

4. A coating composition containing hydrogenated methyl abietate and a melamine-formaldehyde resin which has been reacted with 2-ethyl hexanol and wherein the molal ratio of formaldehyde to melamine is at least about 4:1.

ROBERT C. SWAIN.
PIERREPONT ADAMS.